Patented Aug. 15, 1944

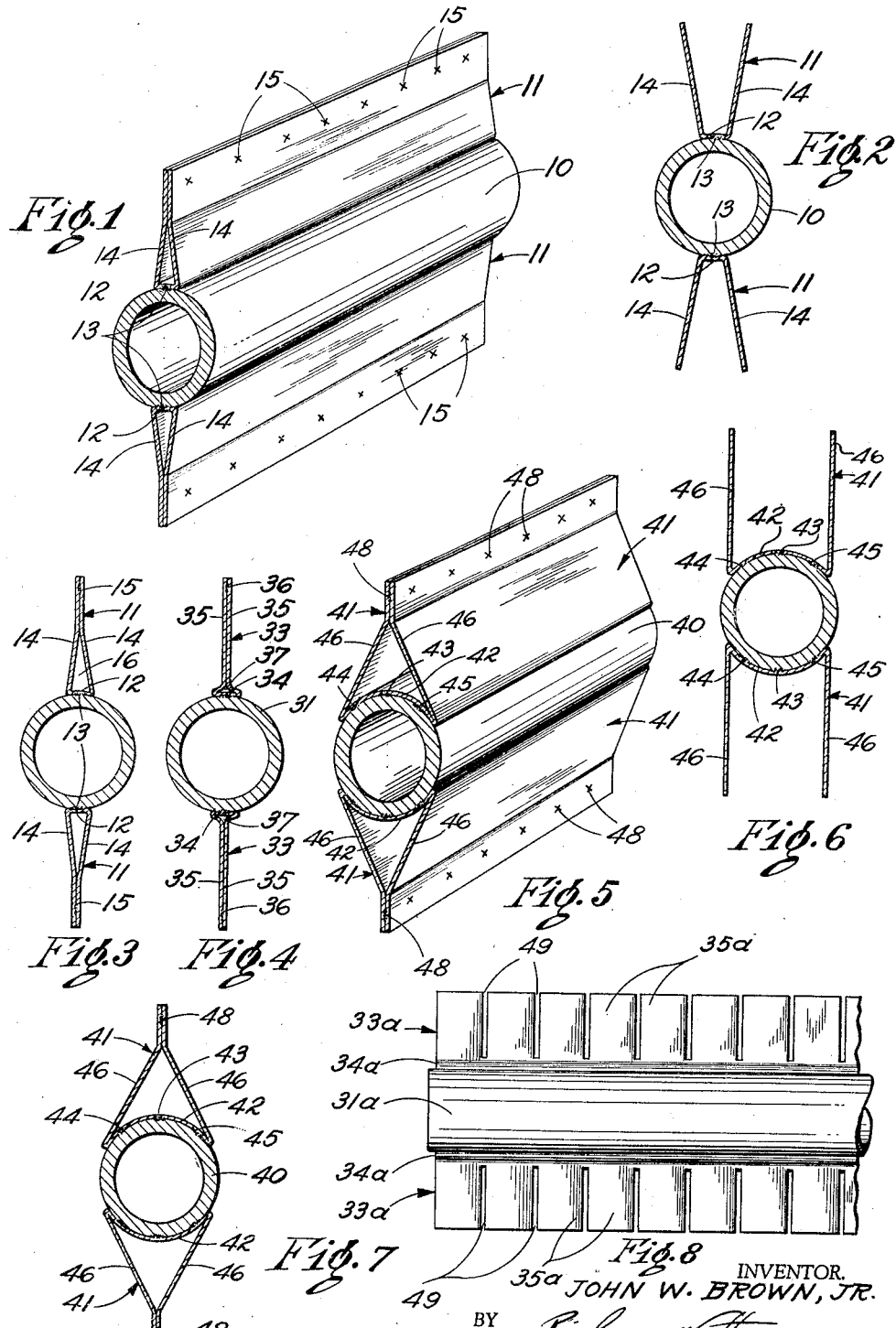

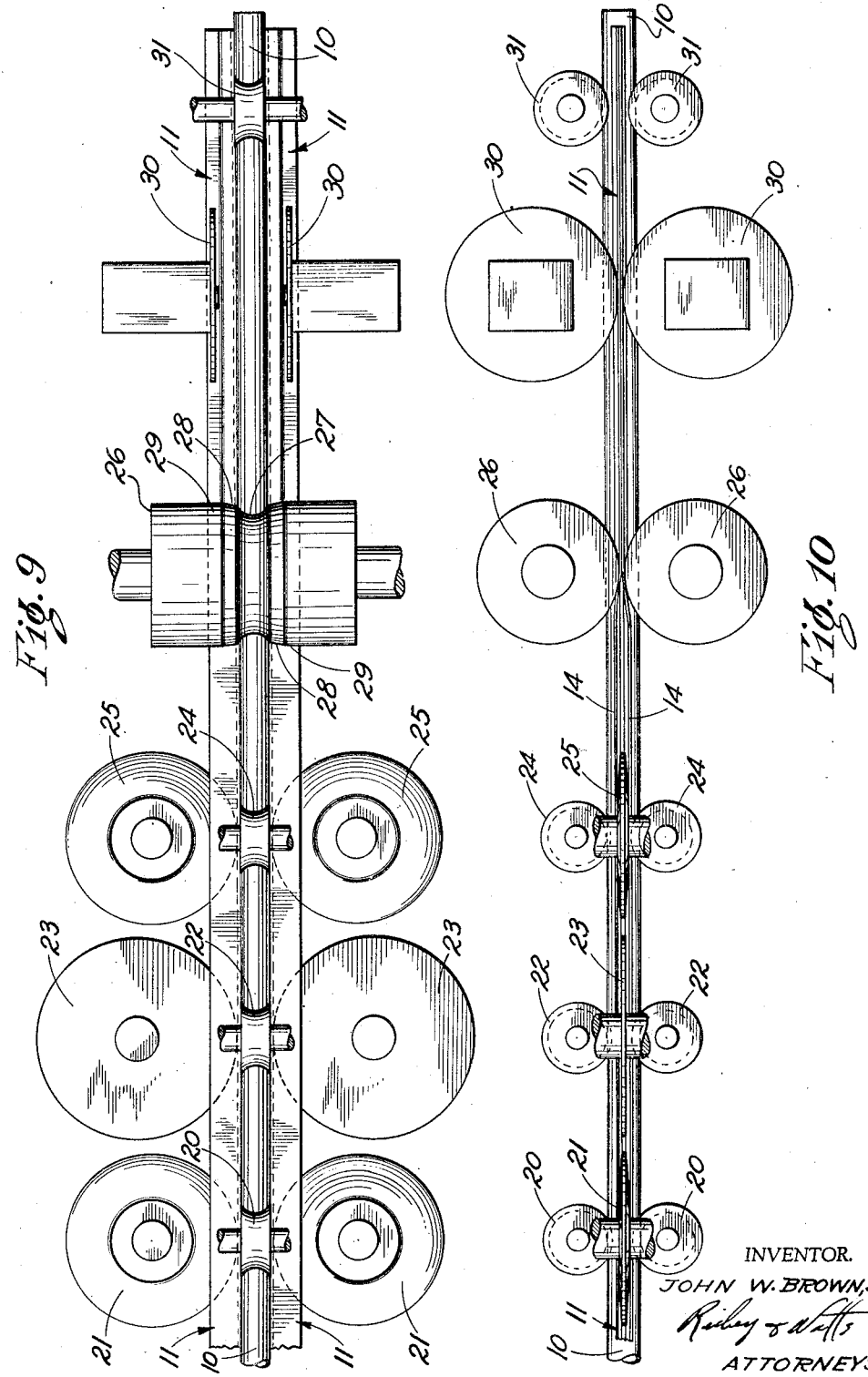

2,355,621

UNITED STATES PATENT OFFICE 2,355,621

FINNED TUBE

John W. Brown, Jr., Lakewood, Ohio, assignor to Brown Fintube Co., Elyria, Ohio, a corporation of Ohio Application April 2, 1941, Serial No. 386,503

10 Claims. (Cl. 257—262)

This invention relates to heat exchanger tubes and method of making same and more particularly to tubes provided with exterior fins for increasing the external surface area thereof.

In my prior applications Serial No. 323,593, filed March 12, 1940, and Serial No. 380,690, filed February 26, 1941, now respectively Patent No. 2,298,249, issued October 6, 1942, and Patent No. 2,261,137, issued November 4, 1941, I have disclosed heat exchanger tubes having fins secured to the exterior thereof and methods and apparatus for making such tubes. The tubes specifically disclosed in said applications were particularly adapted to installations wherein the flow of fluid on the exterior of the tube was longitudinal. The present application relates more specifically to heat exchanger tubes adapted for transverse flow of fluids on the exterior thereof, or to form wall structures, partitions, and the like.

It is among the objects of the present invention to provide such a tube which will be efficient in its heat exchange characteristics and which will have the ability to withstand severe operating conditions for long periods of time. Another object is to provide a tube which may be made more or less streamlined for transverse flow. Another object is to provide a tube of this character which can be manufactured rapidly and economically. A further object is to provide an efficient and economical method of and apparatus for making such tubes. Further and more specific objects of the invention will become apparent from the following description of various forms thereof being made to the accompanying drawings. The essential characteristics are summarized in the claims.

In my prior applications aforesaid, I disclosed tubes wherein channel members were secured to the exterior of the tube. In the preferred embodiment shown in said applications each channel member formed two generally radially extending fins. According to the present invention, one or more channel members may be secured to the exterior of the tube as by resistance welding, or otherwise autogenously welding the base portions thereof to the tube, and thereafter the channel members are deformed so that each channel members is formed into a single fin. The deforming operation can be carried out to produce tubes more or less streamlined to transverse flow and to produce fins of various shapes adapted for various specific purposes only a few of which are disclosed herein.

Referring to the drawings, Fig. 1 is a perspective of a preferred form of finned tube made according to my invention and embodying longitudinally extending fins on diametrically opposite surfaces of the tube; Fig. 2 is a transverse section through the finned tube of Fig. 1 showing the tube as it appears at an early stage in the manufacturing process; Fig. 3 is a similar section illustrating the tube as it appears after a subsequent step has been carried out; Fig. 4 is a transverse section through a modified form of tube; Fig. 5 is a perspective illustrating a further modification of my invention; Figs. 6 and 7 are transverse sections illustrating steps in the manufacture of the tube shown in Fig. 5 corresponding to the steps illustrated in Figs. 2 and 3; Fig. 8 is an elevation showing another modification of my invention; and Figs. 9 and 10 are diagrammatic plan and elevational views, respectively, of an apparatus adapted to carry out my method and manufacture the tubes illustrated in Figs. 1 to 7, the apparatus shown being specifically adapted to the production of the tube shown in Figs. 1 to 3.

A preferred form of my invention as illustrated in Fig. 1 of the drawings may comprise a tube 10 having fin members indicated generally at 11 secured to the exterior thereof at diametrically opposite points. Each fin member preferably comprises a base portion 12 welded as indicated at 13 or otherwise suitably secured to the exterior of the tube and two flange portions 14 extending from and formed integrally with the base portions, the flange portions being bent toward each other and preferably welded together adjacent their outer edges as indicated diagrammatically at 15 so that the flanges are joined together to form a single fin having an open space 16 therein. Those skilled in the art will appreciate that for some purposes it will be preferable to secure only a single member 11 to the tube and that for other purposes it may be desirable to secure more than two such members to the exterior of the tube. However, with two oppositely disposed fin members as illustrated in the drawings, the tube lends itself particularly to use in heat exchangers wherein there is a transverse flow of fluid across the outer surface of the tubes. This type of construction is also suitable for use as a wall structure in furnaces or boilers.

The arrangement of the fins permits a more or less streamlined flow transversely of the exterior of the tube depending upon the relationship between the width of the bases 12 and the diameter of the tube, while the fact that only one surface of each of the flanges 14 is exposed to the gases or fluids on the exterior of the tube insures that heat will be conducted from the flanges to the tube at a high rate with respect to the rate of absorption of heat by the flanges. Thus, the durability and resistance to corrosion of the flanges is excellent, even though the individual flanges themselves are of light gauge material as shown.

The possibility of employing light gauge material of considerably less thickness than the gauge of the wall of the tube as shown in the drawings is of considerable importance from the standpoint of safety in heat exchangers of some types for the light gauge material under the influence of heat shocks and other adverse conditions cannot impose destructive or dangerous forces on the heavy gauge tube. In prior constructions wherein single heavy gauge flanges were employed, difficulties have been encountered because of the fact that heat shocks have resulted in the imposition of excessive strains on the tube and ultimately in failure of the tubes.

In Figs. 2 and 3 I have illustrated steps in a preferred method of manufacturing the tubing shown in Fig. 1. As shown in Fig. 2, the members 11 are preferably initially in the form of open channels. These are positioned on the tube as shown and are preferably welded thereto in the manner described in my prior applications aforesaid by electrode rolls engaging the bases 12 of the channels and arranged to produce autogenously welded areas 13 with their centers substantially evenly spaced along the bases 12 and arranged to insure adequate paths for the transfer of heat between the tube, the base portions 12 and the flanges 14. After the welding operation has been completed, the flanges 14 are bent toward each other to produce the structure illustrated in Fig. 3, thereafter the flanges are welded as at 15 adjacent their outer edges, these welds being either continuous or spaced any convenient distances apart, say about ½ inch in a tube of the general size shown in the drawings. For most purposes it is not necessary to provide a continuous weld between the flanges, although for some services such a weld may be required or preferred.

Preferably the operations of welding the channels to the tube, deforming the channels and welding the flanges of the channels together are carried out continuously in an apparatus such as that diagrammatically illustrated in Figs. 9 and 10. Such an apparatus may comprise a suitable base or frame (not shown) supporting a series of rolls for carrying out the various operations and for guiding the tube and channels through the apparatus. The tube and the channels 11 are progressed through the apparatus in the direction of the arrow and the tube and channels are first entered between the guide rolls 20, which engage the external surfaces of the tube, and the guide rolls 21, which enter the channels to guide and align the channel members with respect to the tube before they are welded thereto. Next, the tube is engaged by a second series of guide rolls 22, while disposed adjacent to these rolls there are electrode rolls 23 suitably connected to a source of current which is controlled preferably in the manner described in my aforesaid applications to produce rows of intermittent welds between the bases 12 of both members 11 and the tube. The electrode rolls preferably engage the bases 12 of the channels and the arrangement is such that the current flows from one electrode roll 23 through the channel bases and tube to the other roll 23, effecting simultaneous welding of oppositely disposed areas between the tube and the bases of the respective channels.

The tube with the channels secured thereto then passes between the tube guide rolls 24 and the channel guide rolls 25. The tube at this point has the cross-sectional appearance illustrated in Fig. 2 and is preferably substantially identical with the tube described and claimed in my aforesaid application Serial No. 380,690; i. e., the welded areas 13 are so shaped and proportioned that the path for the flow of heat from the tube through the welded areas and into the base of the channel is at least substantially as great as the path for the transfer of heat from the base of the channel to the flanges. This is preferably accomplished by making the total welded area at least substantially equal to the combined longitudinal cross-sectional area of the flanges adjacent the base, and the total perimetric length of the welded area at least substantially equal to, and preferably greater than, twice the length of the channel, as described in detail in my application Serial No. 380,690 aforesaid. The tube, with the channel members secured thereto, is then passed between a pair of forming rolls 26 which, as illustrated in the drawings, are provided with central reduced portions 27 to receive the tube and tapered portions 28 and cylindrical portions 29 to engage the flanges 14 and force them together into the form shown in Fig. 3.

The tube is completed by being passed between pairs of flange welding rolls 30 which engage the flanges 13 and 14 of members 11 and which are connected with suitable sources of electricity (not shown) to produce the welds 15 shown in Fig. 1. In each of the welding operations the pressure of the electrode rolls and the flow of current and the timing are properly correlated to produce the desired character of weld. The timing of the flow of current is preferably controlled by thyratron controls which accurately time the current to produce welds of the desired duration. The tube may be progressed through the machine by driving the electrode rolls 23, the forming rolls 26 and the electrode rolls 30 at substantially the same peripheral speeds by any convenient mechanism. The tube then passes through the final guide rolls 31 and is discharged from the machine.

From the foregoing, it will be evident that tubing according to my invention can be produced rapidly and economically by a single apparatus which carries out my method continuously. In practice, the operation can be carried out at speeds of 20 to 25 feet per minute without difficulty and by reason of the fact that in the preferred form identical welding operations are performed on opposite sides of the tube, the completed tube is straight and free from destructive strains.

In Fig. 4 of the drawings I have illustrated a tube which is particularly adapted for boiler wall structures, this tube comprising the central tubular member 32 with fin members 33 secured to diametrically opposite surfaces thereof. The fin members 33 are generally similar to the members 11 heretofore described in that they comprise base portions 34 welded to the exterior of the tube 31 and flanges 35 extending therefrom and welded together near their outer edges, as indicated at 36. The fin members differ from those previously described in that the flanges 35 are bent so that nearly all of their inner surfaces are in engagement with each other, there being only a very small space 37 between the flanges immediately adjacent the base portions 34. This type of structure is particularly adapted for boiler walls, it being possible to weld a series of flanges of this type together to form a continuous wall structure. Because of their strength and rigidity, these tubes, as well as the other forms shown herein, may be used with advantage as structural members in environments where their heat exchange ability is not important. Such tubes are also adapted for some services where there is a longitudinal flow of fluid along the exterior of the tubes and very severe operating conditions. Tubes of this type may be manufactured as described heretofore with the apparatus shown in Figs. 9 and 10, it only being necessary to change the shape of the forming rolls to conform to the desired shape of the fin members.

In Figs. 5, 6 and 7 I have illustrated a further modification of my invention wherein the tube 40 is provided with fin members 41, the bases 42 of these fin members being much wider than the bases shown in Fig. 1 in proportion to the circumference of the tube so that the fin members extend around a considerable proportion of the tube and provide a greater streamlined effect than the constructions illustrated in Figs. 1 and 4. In manufacturing tubes of this sort, the base portions 42 are preferably curved to conform to the tube and may be welded to the tube by a series of centrally disposed welded areas indicated diagrammatically at 43 and preferably produced as described in my aforesaid applications. If the operating conditions are severe and the heat load is great, additional rows of welds as indicated at 44 and 45 may be provided. In case such additional welds are deemed necessary, additional welding rolls will be required in the apparatus or it may be necessary to pass the tube through the fin welding apparatus more than once. However, the general principles of the welding apparatus and the method employed in manufacturing such tubes are identical with those heretofore described, the channel members first being welded to the tube, then formed into the shape shown and finally the flanges 46 are welded together adjacent the outer edges thereof as indicated particularly at 48. Obviously, the shape and proportions of the fins may be varied from the forms shown herein, depending on the requirements of the service for which the tube is intended.

In Fig. 8 of the drawings I have illustrated a further modification of my invention as applied to a finned tube 31a of the type illustrated in Fig. 4. According to this modification of my invention, the flanges 35a and the fins 33a, which are otherwise similar to the fins 33 shown in Fig. 4, are slotted as indicated at 49, from their outer edges inwardly toward the base portions 34a. The reason for this is that under some severe operating conditions there may be a large temperature difference between the tips or outer edges of the fins and the bases thereof. Because the tips of the fins under such conditions will be at a considerably higher temperature than the base portions of the fins, the outer edges will expand to a greater degree than the base portions and such expansion in a continuous fin might cause the outer edge of the fin to become wavy or undulated and might impose severe strains on the structure. The slots 49 permit this expansion to take place without undue strains, and obviate these difficulties.

The slots may be formed either before or after the channel is secured to the tube, but preferably after the channel has been welded to the tube and formed into the shape shown. The slots may be punched in the fins or sawed or formed in other ways well understood by those skilled in the art. They may be extended to varying depths depending upon the service for which the tube is intended; thus, under very severe service conditions the slots may be extended down to but preferably not through the base portions 34a. Under less severe conditions, slots extending only a short distance in from the edges of the fins may be sufficient. Similarly, the spacing of the slots may be varied depending upon the service for which the tube is intended, close spacings being employed for the more severe services. In general, however, slots spaced and proportioned as shown with respect to the size of the fins will be satisfactory for many installations.

While I have illustrated this feature of my invention only in conjunction with a finned tube of the type shown in Fig. 4, those skilled in the art will appreciate that it may be applied to finned tubes of various other types such as tubes of the type illustrated in Fig. 1 or tubes embodying channel section fins such as shown in my prior applications aforesaid.

From the foregoing description of preferred forms of my invention it will be evident that I have provided finned tubing adapted for use in heat exchangers where there is a transverse flow of fluid externally of the tubes, and also adapted for a wide variety of other uses such as wall structure, partitions and the like and as structural members where strength and rigidity are required. Tubes made according to preferred forms of my invention have excellent heat exchange characteristics and are durable under severe operating conditions. The tubes can be produced rapidly and economically particularly by the preferred method and apparatus disclosed herein.

Reference is hereby made to my divisional application for Apparatus for manufacturing finned tubes, Serial No. 544,713, filed July 13, 1944, which contains claims directed to the apparatus disclosed herein.

Various changes and modifications in my invention will become apparent to those skilled in the art. It is, therefore, to be understood that my patent is not limited to the preferred forms described herein, or in any manner other than by the appended claims when given the range of equivalents to which my patent may be entitled.

I claim:

1. The method of making finned tubes which includes the steps of resistance welding the base of a channel section member having a base and two flanges extending therefrom to the exterior of a tube, thereafter bending said flanges toward each other to bring at least the outer edges thereof into contact with each other, and welding said edges together.

2. The method of making finned tubes which includes the steps of resistance welding the base of a channel section member having a base and two flanges extending therefrom to the exterior of a tube, thereafter bending said flanges into contact with each other, and permanently securing said flanges together.

3. The method of making finned tubes which includes the steps of resistance welding the base of a channel section member having a base and two flanges to the exterior surface of a tube, controlling the welding current to produce a series of welded areas disposed between said flanges and of a combined area at least substantially equal to the combined longitudinal cross-sectional area of the two flanges, the total perimetric length of said welds being at least substantially equal to twice the length of the channel member, thereafter bending said flanges toward each other to bring at least the outer edges thereof into contact with each other, and welding said flanges together.

4. The method of making finned tubes which includes the steps of simultaneously resistance welding the bases of separately formed channel section members each having a base and two flanges extending therefrom to oppositely disposed portions of the exterior of a tube, then simultaneously bending the flanges of each channel inwardly toward each other to bring at least the outer edges thereof into contact with each other, and thereafter simultaneously welding the contacting edges of both channel members together.

5. In combination, a tube of substantially uniform wall thickness and a closed hollow fin secured thereto, said fin comprising a channel section member having a base portion and two flanges, the base portion substantially conforming to the outer surface of the tube and being joined thereto by autogenously welded areas, the flanges being bent into contact with each other and joined together.

6. In combination, a tube of substantially uniform wall thickness and a fin secured thereto, said fin comprising a member having a base portion and two oppositely disposed flanges extending therefrom, the base portion substantially conforming to the outer surface of the tube and being joined thereto by autogenously welded areas, the flanges being bent into contact with each other and welded together adjacent their outer edges.

7. In combination, a tube of substantially uniform wall thickness and a closed hollow fin extending generally longitudinally thereof and secured thereto, said fin comprising a member having a base portion and two flanges, the base portion substantially conforming to the outer surface of the tube and being joined thereto by autogenously welded areas, the flanges being welded together adjacent their outer edges and spaced apart from a zone adjacent the welded portion to the base to provide a hollow fin having a generally triangular cross-section.

8. In combination, a tube of substantially uniform wall thickness and a pair of oppositely disposed closed hollow fins extending generally longitudinally thereof and secured thereto, each fin comprising a member having a base portion and two flanges, the base portion substantially conforming to the outer surface of the tube and being joined thereto by autogenously welded areas, the flanges being welded together adjacent their outer edges and spaced apart from a zone adjacent the welded portion to the base to provide a hollow fin having a generally triangular cross-section.

9. In combination, a tube of substantially uniform wall thickness and a longitudinally extending closed hollow fin secured thereto, said fin comprising a member having a base portion and two flanges, the base portion being curved to conform to the outer surface of the tube and covering at least about ninety degrees of the circumference of the exterior of the tube and being joined thereto by autogenously welded areas, the flanges being joined together adjacent their outer edges and spaced apart from a line adjacent the joined portions to their juncture with the base.

10. In combination, a tube of substantially uniform wall thickness and a longitudinally extending fin secured thereto, said fin comprising a member having a base portion and two oppositely disposed flanges extending therefrom, the base portion substantially conforming to the outer surface of the tube and being joined thereto by autogenously welded areas, the flanges being bent into contact with each other and being welded together adjacent their outer edges, the inner surfaces of the flanges being substantially in contact from their outer edges to a zone closely adjacent the base whereby the fin has a generally T-shaped cross-section.

JOHN W. BROWN, Jr.